United States Patent [19]

Curry

[11] 4,451,058
[45] May 29, 1984

[54] TRANSPORT CONVERTER DOLLY WITH FORCED STEERING

[76] Inventor: Norman R. Curry, 3493 Rubens Ct., Burlington, Ontario, Canada, L7N 3K3

[21] Appl. No.: 345,432

[22] Filed: Feb. 3, 1982

[51] Int. Cl.³ .............................................. B62D 13/04
[52] U.S. Cl. ................................ 280/423 A; 280/443; 280/476 R
[58] Field of Search ........... 280/443, 444, 445, 423 A, 280/460 R, 476 R, 103, DIG. 9, DIG. 14

[56] References Cited

U.S. PATENT DOCUMENTS

| 2,092,683 | 9/1937 | Stidham | 280/443 |
| 3,105,704 | 10/1963 | Schramm | 280/443 |
| 3,995,876 | 12/1976 | Ronne | 280/423 A |

FOREIGN PATENT DOCUMENTS 361200 5/1962 Switzerland .................. 280/445

Primary Examiner—John A. Pekar
Attorney, Agent, or Firm—Hirons, Rogers & Scott

[57] ABSTRACT

The invention provides a transport converter dolly for use as the front wheels of a trailer towed by another vehicle, when it is required to provide a substantial spacing between the vehicle and the trailer so as to meet axle loading requirements of the regulatory authorities. The dolly is connected by a towing connection to a transversely-extending bar connected to the rear of the towing vehicle. The wheels of the dolly are forcibly steered as the vehicle train negociates a curve by means of a steering connection between the bar and the dolly wheels. The steering connection preferably is a parallelogram linkage that can be altered in length without affecting the steering it produces. The dolly wheels may be mounted on steerable stub axles or the entire axle may be swivelled by mounting it to the dolly frame via a turntable bearing. The dolly frame may be fixed to the rear trailer or connected thereto by a fifth wheel connection. A latchable turntable bearing may be provided between the dolly frame and the trailer body to facilitate maneuvering to and from a loading dock.

8 Claims, 6 Drawing Figures

TRANSPORT CONVERTER DOLLY WITH FORCED STEERING

Field of the Invention

This invention is concerned with improvements in and relating to transport converter dollies of the kind employed for releasable tandem connection of a rearward vehicle to a forward vehicle, and especially to such dollies of the kind in which the wheels thereof are forcibly steered.

Review of the Prior Art

The tandem connection together of two or more vehicles, particularly a tractor/trailer combination and a second or even a third trailer, is of increasing commercial interest, owing to the cost savings that are possible. Accordingly there have been a number of prior proposals disclosing different equipments for this purpose. In one general type of such equipment a dolly is rididly connected to the frame of the forward trailer, so as to form in effect an extension thereof, and the rear trailer is mounted on the dolly by a fifth wheel connection; such a structure results in comparatively high wear of the dolly tires by sideways scrubbing as the vehicles are steered around a curve. In another general type of prior equipment the dolly is connected to the two vehicles so as to pivot about respective vertical axes, which results in reduced tire wear, but the presence of two closely-spaced vertical pivots between the two trailers introduces an undesirable instability that has been known to result in the vehicles overturning or jack-knifing.

My prior U.S. patent specification Ser. No. 4,162,082 issued July 24, 1979 discloses a self-steering converter dolly in which both of these problems are substantially reduced by providing for self-steering of the wheels of the dolly. Another example of such an improved structure is disclosed in my application Ser. No. 308,971, filed Oct. 6, 1981. In both of these prior art equipments the trailers may be regarded as "close-coupled" in that dolly wheels at the front of the rear trailer are spaced relatively closely to the rear wheels of the forward trailer. The axle loading of heavy transport vehicles is of continuing concern to the regulatory authorities, owing to the severe damage that is caused to highways if substantial overloading is permitted. In most cases the maximum axle loading is determined by a formula in which one of the factors is the longitudinal spacing between successive axles, with the result that most authorities are prepared to permit higher axle loadings, provided the axles in question are spaced a minimum distance from one another, typically about 350 cm (138 inches). Such a relatively large spacing however when applied to the known equipment increases considerably the above-mentioned problems of tire wear and stability.

Definition of the Invention

It is therefore a principal object of the invention to provide a new transport converter dolly for releasable tandem connection of two vehicles which will permit the desired increased spacing between succesive axles without corresponding increase in tire wear and stability problems.

It is a more specific object to provide such a dolly which will provide a stable connection bwteen the two connected vehicles at the maximum spacing permitted by the regulatory authorities while minimizing the amount of wear of the dolly wheel tires.

In accordance with the present invention there is provided a transport dolly for the tandem connection of a rearward vehicle to a forward vehicle comprising:

a dolly frame receiving the forward end of the rearward vehicle;

a dolly axle;

a spring dolly suspension mounting the dolly axle to the dolly frame;

at least two transversely-spaced dolly wheels mounted by the dolly axle for steerable movement of the dolly and on which the dolly runs;

steering link connector means pivotally mounted on the dolly frame for pivotal movement about a vertical pivot axis passing centrally through the dolly axle and connected to the dolly wheels for steering motion thereof by pivotal motion of the steering link connector means about the said vertical pivot axis;

a transverse connector bar adapted to be connected to the rear of the forward vehicle so as to be in fixed orientation in the horizontal plane relative to the forward vehicle, and to change its orientation in the horizontal plane relative to the dolly frame as the forward vehicle traverses a turn;

longitudinal towing connector means having one end connected to the dolly frame and the other end pivotally connected at a respective towing pivot point to the transverse connector bar for towing connection of the two vehicles; and steering connection means comprising at least one logitudinal steering connector, each pivotally connected at one end to the transverse connector bar at a respective steering pivot point transversely spaced from the towing pivot point and connected at the other end to the steering link connector means at a corresponding steering pivot point transversely spaced from the vertical pivot axis, for steering motion of the steering link connector means about the vertical pivot axis and corresponding steering motion of the dolly wheels upon displacement between the two vehicles in the horizontal plane as they traverse a turn.

Description of the Drawings

Forced steering converter dollies which are particular preferred embodiments of the invention will now be described, by way of example, with reference to the accompanying diagrammatic drawings, wherein.

Similar parts are given the same reference number in all the figures of the drawings.

Description of the Preferred Embodiments

Figure 1:
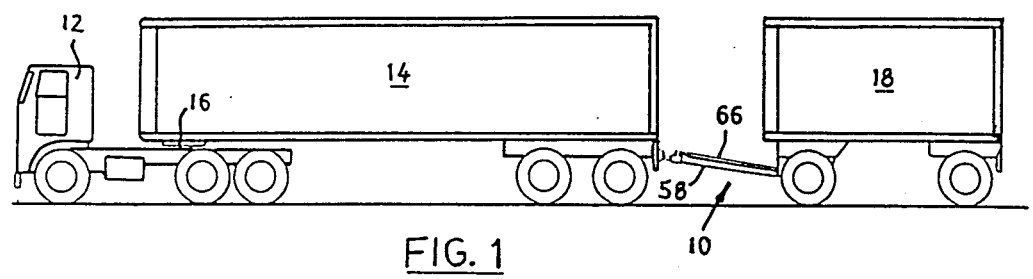
FIG. 1 is a side elevation showing the combination of a front tractor/trailer and a second trailer employing the dolly of the invention to provide the forward wheels for the second trailer.
Figure 2:
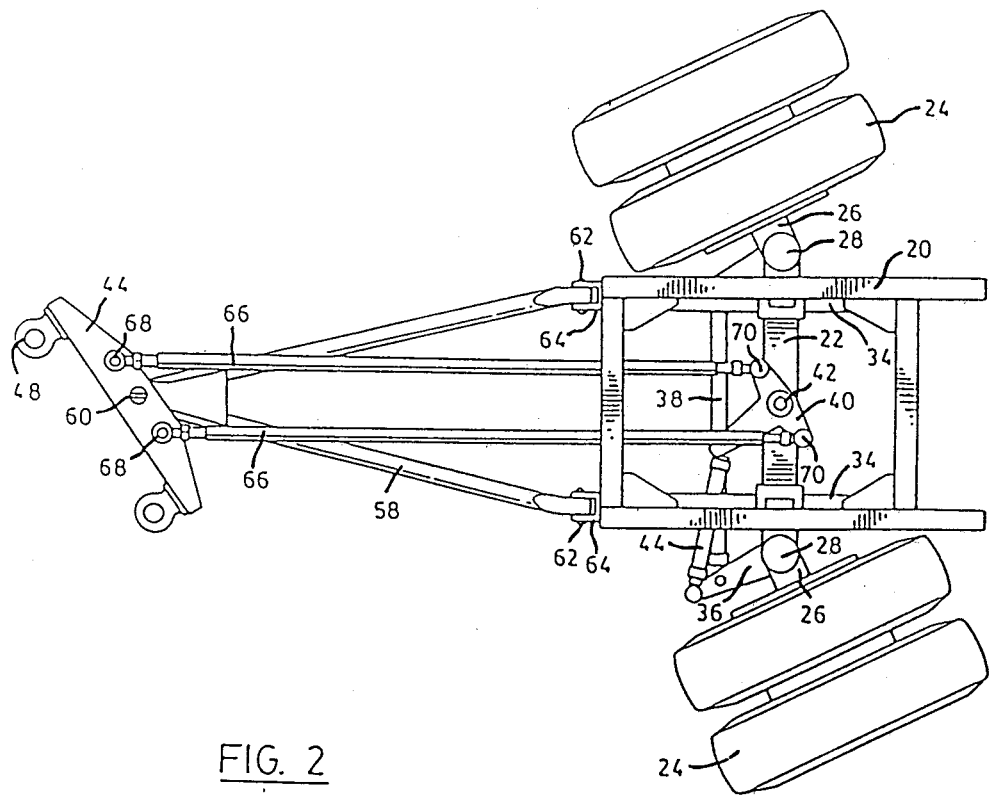
FIG. 2 is a plan view from above of a dolly which is a first embodiment of the invention, showing the wheels thereof in a typical angled steering attitude.
Figure 3:
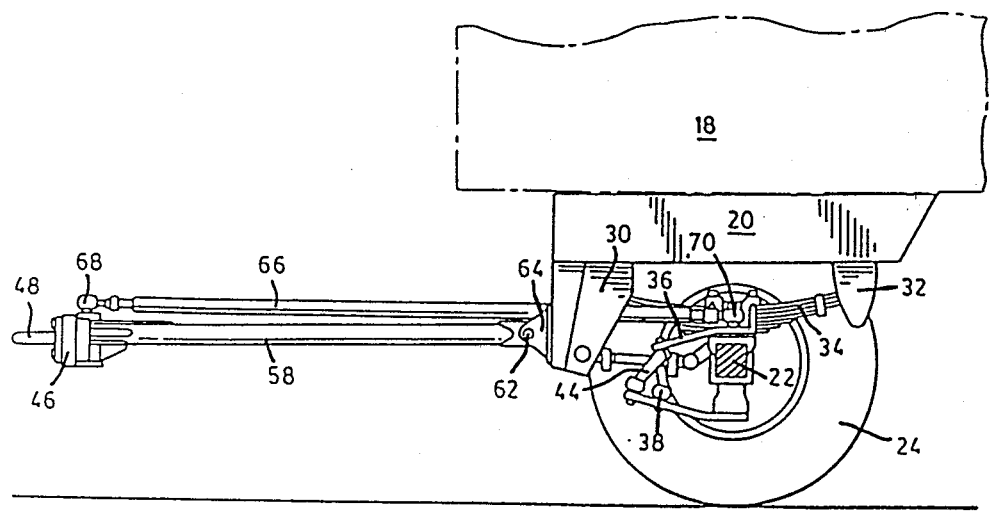
FIG. 3 is a side elevation of the dolly of FIG. 2, with the near-side sheels and their stub axle being shown removed, and the remaining far-side wheels being shown in the "straight-ahead" position.
Figure 4:
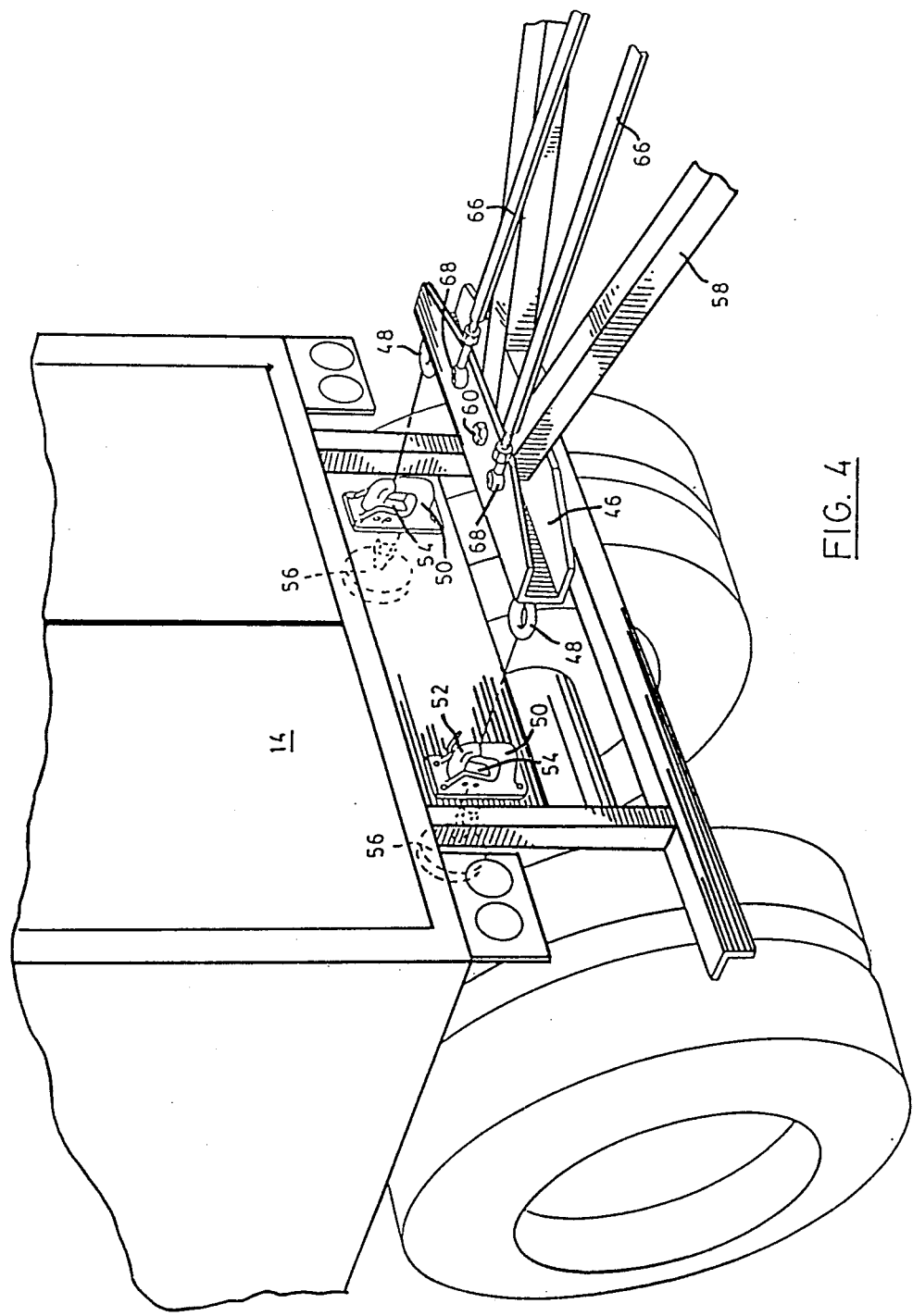
FIG. 4 is a perspective view showing the rear end of the forward trailer and the means by which the dolly is connected thereto.

FIG. 1 illustrates a typical application of a forced steering transport converter dolly 10 of the invention, wherein the tractor 12 of a tractor/trailer combination has the forward trailer 14 coupled thereto via a fifth wheel 16, while a second rear trailer 18 is coupled to the forward trailer via the dolly. Referring now more specifically to FIGS. 2-4, the dolly consists of a short rigid rectangular frame 20 which in this embodiment is permanently fastened to the front end of the rear trailer 18. Since the frame is permanently fastened, the trailer does not require supplementary struts at its front end to support the end in the absence of the dolly. A transverse trailing axle 22 carrying two spaced pairs of running wheels 24, stub axles 26 and king pins 28 is mounted beneath the frame 20 by any conventional suspension system, which in this embodiment is illustrated as consisting of downwardly-extending hangers 30 and 32 and leaf springs 34 to which the axle is clamped; the usual shock absorbers are not shown for clarity of illustration. The stub axles 26 are pivotally connected to the respective ends of the axle 22 by the king pins 28 and each such assembly is provided with a forwardly-extending steering arm 36, the two arms being connected together by a track rod 38 which is pivotally connected at its ends to the respective links.

A T-shaped steering link connector 40 is pivotally mounted on the axle 22 for pivotal motion about a vertical pivot 42 which passes centrally through the axle, the leg of the T-shape extending generally forwardly and being pivotally connected at its forward-most end by an adjustable length link 44 to one of the steering arms 36, so that the said pivoting motion of the steering link connector in a horizontal plane about the vertical pivot 42 is accompanied by steering motion of the two pairs of dolly wheels 24 on the respective king pins.

The connection between the rear end of the forward vehicle and the dolly 10 consists of a transverse connector bar 46 having mounted at each of its transversely-spaced ends a respective vertically-opening loop 48, each of which cooperates with a respective transversely-spaced closable vertically-upward-opening and extending hook member 50 (FIG. 4) rigidly mounted on the frame of the forward vehicle 14. Upon mounting of the loops on the respective hooks they are retained thereon by respective latch members 52; moreover, each hook is provided with a pneumatically-urged plunger 54 operated by a pneumatic motor 56 that is operative while the vehicle is running to engage the loop and press it against the hook rear wall, thereby preventing longitudinal "chatter" movements between the hoop and the loop. The transverse connector bar is thereby held rigidly in its transverse relation to the forward vehicle 14, so that it will change its orientation in the horizontal plane relative to the folly frame as the forward trailer traverses a curve, while permitting required pitching motion between the two trailers by pivoting movement about a horizontal axis.

The transverse connector bar 46 is connected by longitudinal towing connector means for towing connection of the two vehicles comprising a triangular-shaped towing frame 58 which is pivotally connected for horizontal motion about a vertical pivot 60 to the transverse connector bar and is pivotally connected for pitching motion about horizontal pivots 62 to the dolly frame 20 at two transversely spaced points thereon constituted by brackets 64. It is this frame 58 that withstands the forces between the two trailers as the vehicle accelerates, decelerates and the trailers steer relative to one another.

The transverse connector bar 46 and the steering link connector 40 are connected for steering motion of the latter and thereby of the two pairs of wheels 24 by means of two transversely-spaced parallel adjustable-length rigid links 66, each of which is connected to the transverse connector bar at a respective forward transversely-spaced steering pivot point on opposite sides of the pivot 60 by a ball joint 68, and is connected to the steering link connector at two corresponding transversely-spaced steering pivot points on opposite sides of the vertical pivot 42 by a respective ball joint 70. It will be seen that the two rigid links 66, the cross arm of the steering link connector 40 and the portion of the transverse connector bar 46 between the two connection points 68 form a parallelogram linkage connecting the transverse connector bar and the dolly wheels for steering motion of the latter.

Thus, as long as the forward and rearward trailers remain in the "straight" configuration relative to one another the wheels 24 will also remain in the corresponding "straight-ahead" orientation relative to the second trailer 18. As the forward vehicle 12/14 steers in any direction the transverse connector bar will change its orientation in the horizontal plane relative to the dolly frame, because of its transversely rigid connection to the frame of the forward trailer. The corresponding motion of the parallelogram linkage will be transferred to the steering link connector 40, and thereby to the dolly wheels, so that they will be forced to turn with a steering motion of appropriate direction and extent to steer the rearward vehicle in the same track, reducing substantially, if not completely eliminating, sideways scrubbing of the tires. Thus, the dimensions of the parallel linkage are arranged for the dolly wheels to steer the appropriate amount around the curve, the most extreme example of which is illustrated by FIG. 2. In addition to the reduction in sideways scrubbing of the wheels and consequent wear of the tires, there is also a reduction of the possibility of the rear trailer overturning. As soon as the two trailers resume their straight-ahead attitude for normal straight running the wheels are positively returned to their straight-ahead position.

It is important that the dolly frame 20 is connected to the frame of the forward vehicle in a manner that will freely permit pitching movement between the two, but that will hold them securely against any relatively yawing movement while also permitting only relatively very small tilting movements, since the latter two movements could result in instability of the trailer to an extent that overturning or jack-knifing occurs. The spaced hook and loop connections described above freely permit the required pitching motion by pivoting movement about a horizontal axis, while yawing motion is precluded because of the transverse spacing of the two connections. The limited tilting movement that is desirable to prevent the application of excessive shocks to the vehicle body is readily provided by the spring suspension.

This particular construction permits the ready retrofit of the invention to an existing truck, and is also suitable for use in a trailer train of more than two trailers, e.g. between the second and third trailer of a "triple train".

Figure 5:
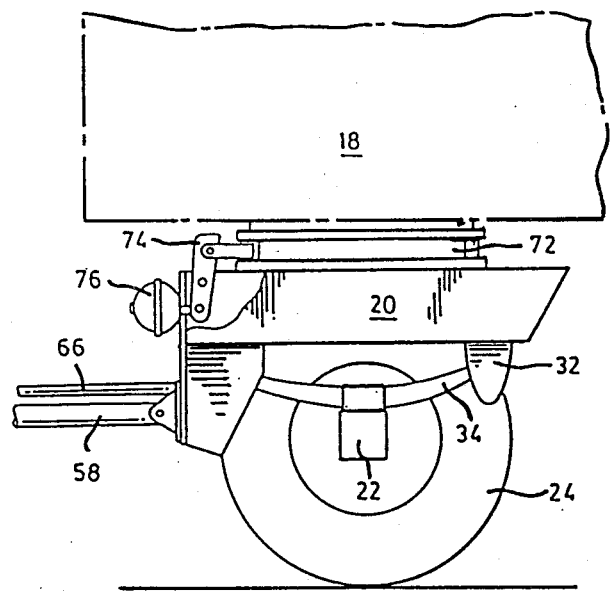
FIG. 5 is a part side elevation generally similar to FIG. 3, to illustrate another embodiment of the invention.

One difficulty that may be encountered with a forced steering dolly of the invention is that the amount of steering of the dolly wheels that is permitted by the steering coupling is insufficient for ready maneuvering of the train to and from a loading dock. This operation therefore is facilitated by the construction of FIG. 5, in which a turntable 72 is provided between the dolly frame 20 and the trailer body 18. During normal running the turntable and the dolly frame are latched together against pivoting motion by means of a driver-controlled latch 74 that is engaged when the dolly frame and the turntable are in the appropriate "straight-ahead" positions. The latch is spring urged into the latch engaged position and is held in the unlatched position via a pneumatic motor 76.

Figure 6:
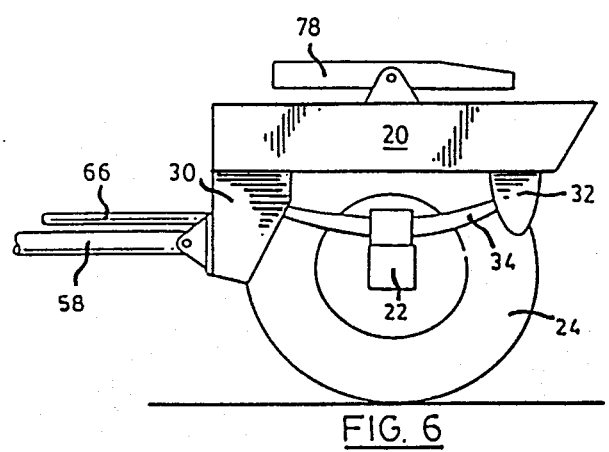
FIG. 6 is a part side elevation, generally similar to FIG. 3, to illustrate a further embodiment of the invention.

In the embodiment described above with respect to FIGS. 2-4, the dolly frame 20 is rigidly connected to the rear vehicle body, but this may not always be desirable, in which case an embodiment as illustrated by FIG. 6 may be employed, in which a fifth wheel structure 78 is mounted on the dolly frame and engages the usual king pin structure at the forward end of the rear trailer frame. With such an embodiment the forward end of the rear vehicle will require the usual extendible struts to support the front end of the vehicle from the ground when it is not engaged on the fifth wheel.

In a further embodiment of the invention the wheels 34 are mounted directly on the axle 22, which is mounted by the suspension system 30-34 to a dolly sub-frame mounted beneath the dolly frame 20 and supporting it by a turntable bearing for relative rotation about a vertical steering axis. The steering link connector is connected to the dolly sub-frame and rotates for corresponding steering motion of the axle 22 and wheels 24 in a manner corresponding to that in which the stub axles of the first-described embodiment is steered.

We claim:

1. A transport dolly for the tandem connection of a rearward vehicle to a forward vehicle comprising:
    a dolly frame receiving the forward end of the rearward vehicle;
    a dolly axle;
    a spring dolly suspension mounting the dolly axle on the dolly frame;
    at least two transversely-spaced dolly wheels mounted by the dolly axle for steerable movement of the dolly and on which the dolly runs;
    steering link connector means pivotally mounted on the dolly frame for pivotal movement about a vertical pivot axis passing centrally through the dolly axle and connected to the dolly wheels for steering motion thereof by pivotal motion of the steering link connector means about the said vertical pivot axis;
    a transverse connector bar adapted to be connected to the rear of the forward vehicle so as to be in fixed orientation in the horizontal plane relative to the forward vehicle, and to change its orientation in the horizontal plane relative to the dolly frame as the forward vehicle traverses a turn;
    longitudinal towing connector means having one end connected to the dolly frame and the other end pivotally connected at a respective towing pivot point to the transverse connector bar for towing connection of the two vehicles; and
    steering connection means comprising at least one logitudinal steering connector, each pivotally connected at one end to the transverse connector bat at a respective steering pivot point transversely spaced from the towing pivot point and connected at the other end to the steering link connector means at a corresponding steering pivot point transversely spaced from the vertical pivot axis for steering motion of the steering link connector means about the vertical pivot axis and corresponding steering motion of the dolly wheels upon displacement between the two vehicles in the horizontal plane as they traverse a turn.

2. A transport dolly as claimed in claim 1, wherein said steerig connection means comprises two transversely spaced, rigid, parallel links pivotally connected at their forward ends to the transverse connector bar at two transversely spaced steering pivot points on opposite sides of the towing pivot point and pivotally connected at their rearward ends at two corresponding transversely spaced steering pivot points to the steering link connector on opposite sides of the vertical pivot axis, whereby the two parallel arms and the respective portions of the connector bar and the steering link means between the said pivot points constitute a parallelogram steering linkage.

3. A transport dolly as claimed in claim 1, wherein the said dolly axle comprises a central portion mounted on the dolly frame by the suspension, respective stub axle and king pin assemblies pivotally mounted on the ends of the axle central portion and having respective steering arms and link connecting means connecting the said steering link connector to the steering arms for steering movement of the wheels upon pivotal motion of the steering link connector about the vertical pivot axis.

4. A transport dolly as claimed in claim 3, wherein the steering link connector is of T-shape with the foot of the T extending forwardly, the said link connection means connecting the foot of the T to the steering arms of the king pins which are forwardly-extending.

5. A transport dolly as claimed in claim 1, wherein the dolly frame includes a dolly sub-frame, the said axle being mounted by the suspension to the sub-frame, and the sub-frame being mounted to the frame for pivoting motion about a vertical steering axis passing centrally through the axle by a turntable bearing, the steering link connector means being connected to the dolly sub-frame for pivoting motion thereof about the said vertical steering axis.

6. A transport dolly as claimed in claim 1, wherein the said longitudinal towing connector means comprises a triangular frame having its front apex pivotally connected at said towing pivot point to the transverse connector bar for motion relative thereto in the horizontal plane and having its transversely spaced rear ends pivotally connected at spaced connection points to the dolly frame for pivoting motion about a horizontal axis.

7. A transport dolly as claimed in claim 1, wherein means for connecting the transverse connector bar to the forward vehicle so as to be in the fixed horizontal orientation relative thereto comprises a pair of transversely spaced upwardly-opening loop members mounted on the transverse connector bar to extend longitudinally forwardly therefrom, and respective transversely spaced upwardly-opening hook members mounted on the rear of the forward vehicle frame, so that each hook member hooks into a respective loop member and thereby attaches the transverse connector bar to the forward vehicle frame for free pitching movement between the bar and the forward vehicle, but without substantial tilting or yawing movements between the bar and the forward vehicle frame, so as to permit and prevent corresponding movements respectively between the forward vehicle frame and the dolly frame.

8. A transport dolly as claimed in claim 1, and including a turntable bearing mounted on the dolly frame to receive the forward end of the vehicle body and permit pivoting movement thereof relative to the dolly frame about a vertical pivot axis passing centrally through the dolly axle, and latch means connected between the bearing and the dolly frame and operagle selectively to latch the bearing against the said pivoting movement thereof.

* * * * *